(12) United States Patent
Mueller

(10) Patent No.: US 7,546,034 B2
(45) Date of Patent: Jun. 9, 2009

(54) CIRCUIT ARRANGEMENT FOR LINE PROTECTION OF OPTICAL DATA TRANSMISSION

(75) Inventor: Horst Mueller, Hohenschaeftlarn (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 436 days.

(21) Appl. No.: 10/450,184

(22) PCT Filed: Jan. 23, 2002

(86) PCT No.: PCT/DE02/00222

§ 371 (c)(1),
(2), (4) Date: Nov. 12, 2003

(87) PCT Pub. No.: WO02/061995

PCT Pub. Date: Aug. 8, 2002

(65) Prior Publication Data

US 2004/0076431 A1    Apr. 22, 2004

(30) Foreign Application Priority Data

Feb. 2, 2001    (DE) .................................. 101 04 704

(51) Int. Cl.
*H04B 10/00* (2006.01)
(52) U.S. Cl. .............................................. 398/5; 398/7
(58) Field of Classification Search .................. 398/2, 398/3, 4, 5, 6, 7, 1
See application file for complete search history.

(56) References Cited

U.S. PATENT DOCUMENTS

| 5,510,917 | A | * | 4/1996 | Corke et al. ................... 398/34 |
| 5,717,796 | A | | 2/1998 | Clendening ................... 385/24 |
| 5,777,761 | A | * | 7/1998 | Fee .................................... 398/7 |
| 6,094,440 | A | * | 7/2000 | Sugawara et al. ........... 370/465 |
| 6,434,288 | B1 | * | 8/2002 | Uemura et al. ................ 385/16 |
| H2075 | H | * | 8/2003 | Gnauck et al. ................ 398/58 |
| 6,947,668 | B1 | * | 9/2005 | Koeppen et al. .............. 398/16 |

FOREIGN PATENT DOCUMENTS

| EP | 0 483 790 | 5/1992 |
| EP | 0483790 | 5/1992 |
| EP | 0 644 704 | 3/1995 |
| EP | 0644704 | 3/1995 |
| EP | 0 920 153 | 6/1999 |
| EP | 0920153 | 6/1999 |
| EP | 0 938 244 | 8/1999 |
| EP | 0938244 | 8/1999 |
| GB | 2 346 280 | 8/2000 |
| GB | 2346280 | 8/2000 |
| WO | WO 0028670 A2 * | 5/2000 |

* cited by examiner

*Primary Examiner*—Christina Y Leung
(74) *Attorney, Agent, or Firm*—Dickinson Wright, PLLC; Kevin R. Spivak

(57) ABSTRACT

The invention relates to a method and an electro-optical circuit arrangement for line protection in a WDM data transmission link comprising at least two selectable optical data transmission lines which can respectively transmit data via n data channels, the change-over to the respectively desired data transmission line occurring by means of optical switches between network elements on the receiver side and demultiplexers.

9 Claims, 6 Drawing Sheets

CIRCUIT ARRANGEMENT FOR LINE PROTECTION OF OPTICAL DATA TRANSMISSION

BACKGROUND OF THE INVENTION

For transmission of optical signals within the Synchronous Digital Hierarchy (SDH) corresponding to the European standard or within the Synchronous Optical Network (SONET) corresponding to the North American standard as the case may be, transmission methods that are as inexpensive as possible are sought. For cost reasons, glass fiber, in particular, is used as a transmission medium because of the large bandwidth and range due to the low attenuation. The optimum use of these optical connections is sought by multiple utilization of glass fibers using Wavelength-Division Multiplexing (WDM). To protect the transmission in the event of failure of a link, the signals are carried separately on two glass fibers (working and protection).

From patent application DE 19 731 494 of the applicant, a circuit arrangement is known whereby the protection of the transmission in ring structures is guaranteed by the multiple utilization of glass fibers using Wavelength-Division Multiplexing (WDM).

The corresponding application papers laid open to public inspection DE 19 731 494 describe a method of data transmission in a bi-directional working channel between several terminals of an optical ring network with a protection device, whereby in the event of a disturbed data transmission a protection connection using a wavelength-division multiplexing method in a working channel via the undisturbed section of the ring network is enabled, whereby a single bi-directional protection channel having a predetermined wavelength range, that has at least the transmission capacity of the working channel, connects all the terminals together, and in the event of a connection disturbance between the terminals adjacent to a disturbed section of the link, a protection connection is then established in the protection channel via the undisturbed section of the ring network, with the unaffected terminals being looped through the protection channel. In practice, this is achieved in that in the event of a fault of a working line assembly a switch to the assigned protection line assembly takes place in order to continue to maintain the working connection. In this case, the changeover takes place in the electronic assemblies.

Accordingly, an arrangement for data transmission between several terminals in an optical ring network with a protection device is also disclosed, that in the event of a fault enables data transmission in a working channel via the undisturbed section of the ring network using wavelength-division multiplexing, with wavelength-division demultiplexers via which wavelength-individual working signals and protection signals are decoupled, and wavelength-division multiplexers via which the wavelength individual working signals and protection signals are coupled, with a single bi-directional protection channel having a predetermined wavelength range with at least the transmission capacity of the working channel being provided that connects all terminals together.

The optical switches used here between the outputs of the wavelength-division demultiplers and the inputs of the wavelength-division multiplexers as well as of line assemblies, serve only to loop through the protection channel in the event of an undisturbed connection or in the event of a terminal affected by the fault to be able to switch it to the protection channel, to establish a protection connection via the undisturbed section of the ring network. The actual switching between both data transmission channels takes place in the electronic part of the network element.

The method described here is provided as an application in an optical ring network and the associated circuit arrangement is relatively expensive, therefore, it is not cost-effective for a pure "point-to-point" connection.

In WO 00/28670, an optical switch is used to switch between two transmission lines or two channel signals. However, in this case it is necessary to perform an optical monitoring before the optical switch for each channel of the two channel signals, via which the optical switch is controlled via the control unit.

In EP 0 920 153 A2, a version for a protective transmission of a ring network is disclosed. Two optical switches SW 618, 619, each with an output signal $\lambda 3$, $\lambda 4$, are placed in circuit before a receiver side network element TO NE. The input signals of the optical switches SW 618, 619 correspond in each case to a "wavelength-identical" output signal (e.g., $\lambda 3$) of two demultiplexers DEMUX 700, 710 assigned, in each case, to an optical transmission line 101, 102, that from the WDM signal transmitted via the optical lines 101, 102 forms four output signals with different wavelengths $\lambda 1, \lambda 2, \lambda 3, \lambda 4$.

To switch through one of the two input signals to one of the optical switches SW 618, 619, a monitor unit is provided that is supplied with parts of both input signals and is correspondingly controlled via a monitoring channel $\lambda s$.

An object of the present invention is, therefore, to provide a simple circuit arrangement whereby line protection with a "point-to-point" connection is achieved in the most inexpensive possible manner.

SUMMARY OF THE INVENTION

According to a basic concept of the present invention, it is proposed to improve a known circuit arrangement for line protection of an optical data transmission link, that has at least two selectable optical data transmission lines between a transmitter side and a receiver side, on which optical signals are transmitted in each case via n data channels of different frequency, with n network elements for conversion of electronic data signals to optical signals being provided at the transmitter end and with a multiplexer being arranged downstream of each of the network elements for each optical data transmission line and with the optical data transmission lines each being assigned a demultiplexer at the receiving side, whose outputs assigned in each case to one of the n data channels is applied via an optical switch, that in each case switches an optical data transmission line, to the particular input of n network elements at the receiver side for optical/electrical conversion, so that the signal switched through in each case via one of the optical switches is applied, after optical/electrical conversion in the receiver side network element, is applied to the monitoring device assigned to this network element for determination of quality or performance values, and that using the determined quality or performance values a control or switching of the optical switch to the particularly qualitatively-better optical data transmission line takes place.

This enables a part of the electronic assemblies of the network elements to be omitted and a substantial cost reduction to be achieved.

An advantageous embodiment of the method of the present invention includes the signals to be transmitted being applied in each case to the data transmission line of the two that has an overall better quality. In this way, the best possible line is always chosen, a high data transmission rate achieved and the efficiency of the system optimized.

Advantageously, the changeover of the transmission to the better data transmission line in each case can take place via a monitor circuit, with the quality of the data transmission lines being signaled to this monitor circuit.

A further functional improvement of the circuit arrangement can be that the transmission line with the poorer quality or that has failed, including after shutdown, can be monitored, preferably by the monitoring circuit, and in the event of an improvement of the quality or restoration after a fault it can again be made available for data transmission. In this way, a substantial easing of the servicing and maintenance of data transmission lines is achieved, because manual interventions are no longer necessary after the removal of line faults.

To enable automatic restoration of failed transmission lines, n–1 network elements for n channels and n–1 channels for operation can be provided by the n network elements and the nth network element and the nth channel can be used to monitor a failed transmission line.

For example, a glass fiber or another optical conductor, or also optical directional links without carrier materials, can be used as data lines.

Advantageously, for simultaneous switching of all electro-optical switches, a monitor circuit can be provided that serves for the individual switching of electro-optical switches for each data transmission line.

Furthermore, to monitor the quality of data transmission in the network elements, RST functions and/or MSP functions and/or procedures for checking a frame synchronization and/or determining the bit error rate for each data transmission line can be provided.

A further advantageous embodiment of the circuit arrangement in accordance with the present invention is a monitor circuit that, if the quality of a data transmission line drops below a specific level, switches the transmission to the better data transmission line in each case via a monitor circuit.

In a particular embodiment of the circuit arrangement in accordance with the present invention, either optical splitters, as distributors at the signal end, can be provided that simply split the data signals with a loss of 3 dB or optical switches can be provided that are controlled according to the quality situation of the data transmission lines or data transmission channels and apply the data signals without loss to the required data transmission line.

Furthermore, to control the optical switches at the transmission side, an additional communication path can be provided between the receiver and transmitter ends. This communication path can, for example, be an electrical connection between the receiver and transmission sides, but there is also of course the possibility in this case of using a free optical channel or one that is only occasionally used.

Furthermore, the optical switches at the transmitter side can be controlled in such a way that the position of the switches at the receiver side is mirrored. Control of the optical switches at the transmitter side is thus realized, the position of the switches at the receiver side is copied and their positions detected from opposing data transmission lines.

Additional features and advantages of the present invention are described in, and will be apparent from, the following Detailed Description of the Invention and the Figures.

DETAILED DESCRIPTION OF THE INVENTION

Figure 1:
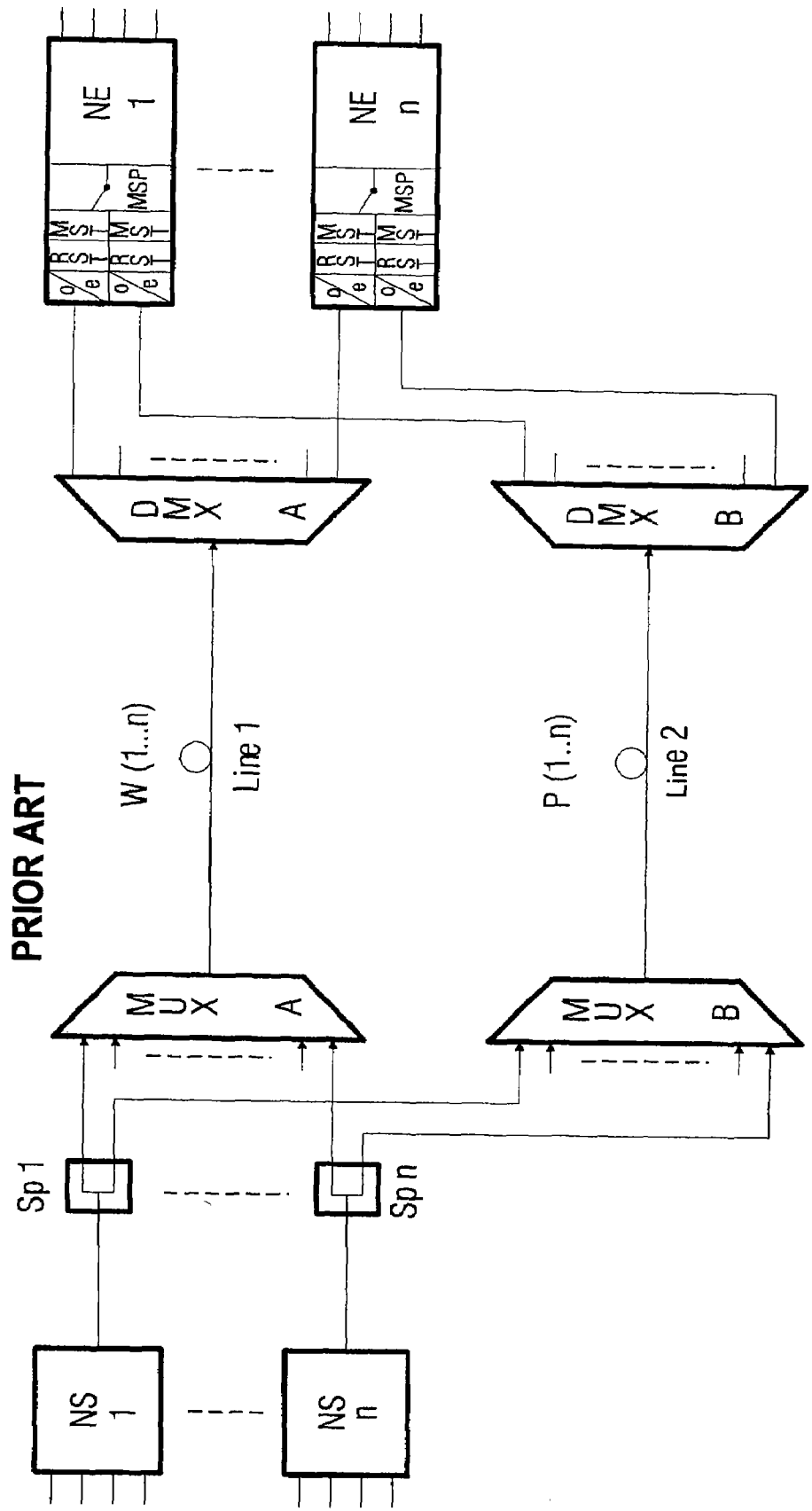
FIG. 1 shows a known "point-to-point" connection with line protection as is known in the prior art.

FIG. 1 shows a known "point-to-point" connection with two data transmission lines Line 1 and Line 2. For reasons of clarity, only one transmission direction is shown but of course the indicated data lines are still present in the opposite direction. This return direction is of analog construction for this purpose, the same as in the following FIGS. 2-5.

In this case, the optical output signals of the n transmission side network elements NS 1 . . . NS n are applied via optical splitters Sp 1 . . . sp n to the WDM multiplexers MUX A and MUX B. Each of the n network elements NS 1 . . . NS n transmits on a certain wavelength $\lambda_i$. Two WDM data transmission links Line 1 and Line 2 are provided, with the data transmission Line 1 being normally assigned to working and Line 2 to the protection link.

At the receiver side, the WDM demultiplexers DMX A and DMX B split the line signals into the signals of their specific wavelengths $\lambda_i$ and apply these to the n receiver side network elements NE 1 . . . NE n.

Each of these receiver side network elements has two optical input interfaces o/e and, after an optical/electrical conversion, selects the signal of the two which has the better quality. If, for example, these are SDH signals according to the ITU-T recommendation G.707, the regenerator section and the multiplex section are terminated in the functional stages RST and MST. In this case, the frame synchronism and the bit error rate as well as the source/destination address of the incoming signals are mainly monitored. The following multiplex section protection MSP then selects the signal of the two which has the better quality on the basis of this monitoring; e.g., that with the lower bit error rate.

This known method has the disadvantage that it is relatively expensive because the optical input circuits and the RST and MST functions are provided twice in the network elements NE 1 . . . NE n.

Figure 2:
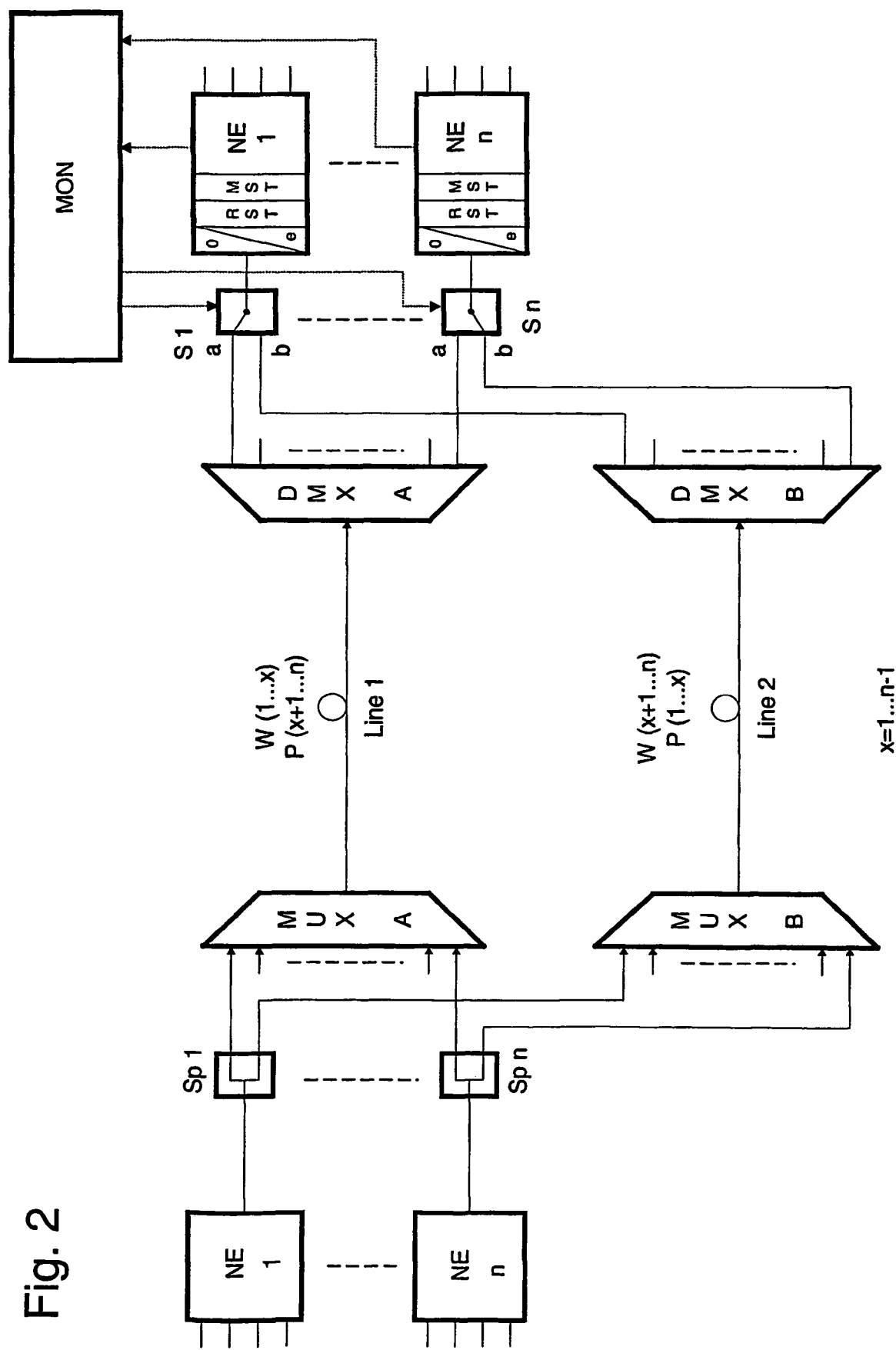
FIG. 2 shows a simple circuit arrangement in accordance with the present invention with optical splitters and optical switches.
Figure 3:
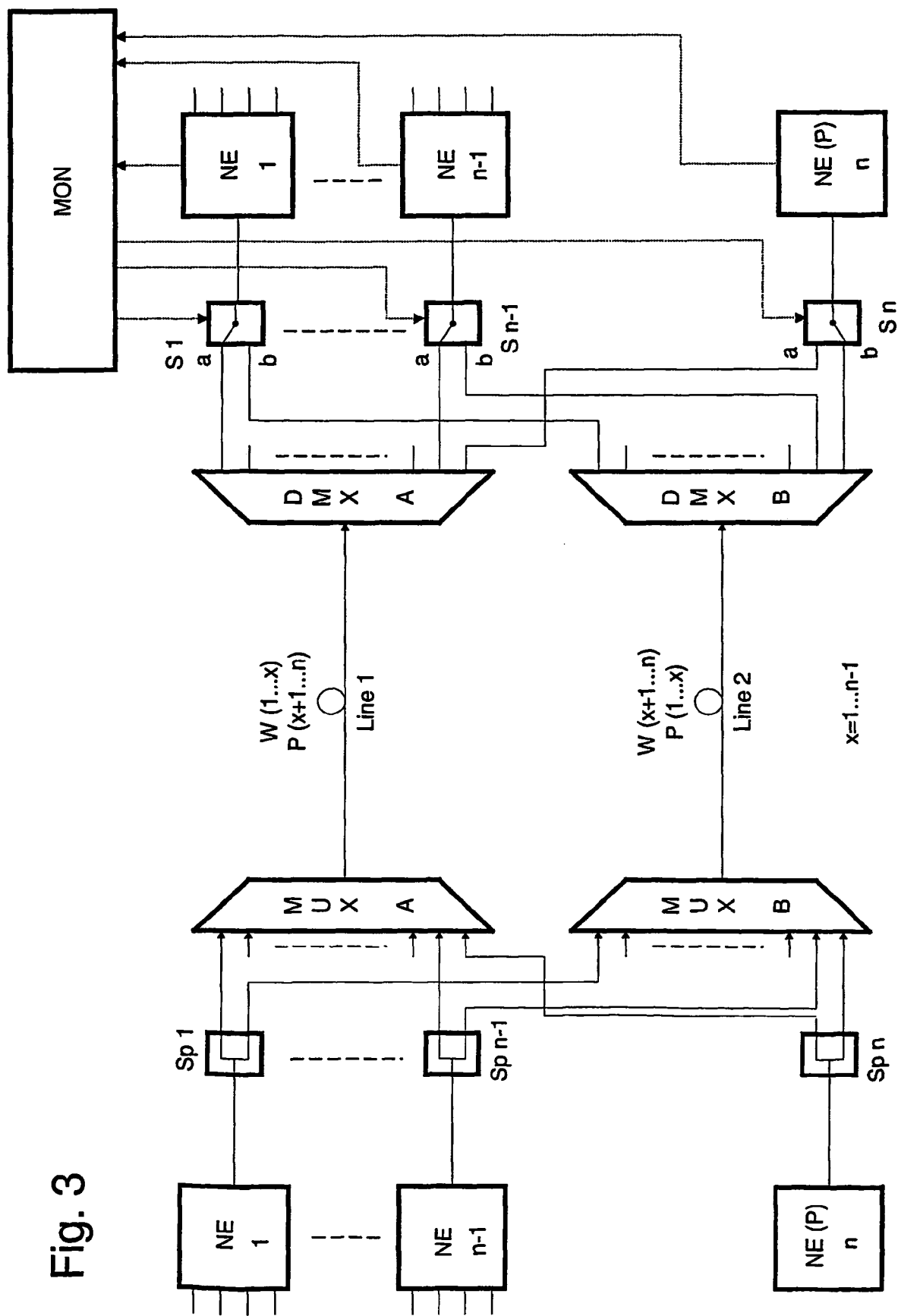
FIG. 3 shows a circuit arrangement in accordance with FIG. 2 but with an additional monitoring channel.

The circuit arrangement for performing the improved method in accordance with the present invention shown in FIG. 2 shows that this expense of doubling the optical input circuits is avoided.

In this simple version, the network elements NE 1 . . . NE n have only one optical interface each at the receiver side and only one RST and MST function. Optical switches S1 . . . Sn are arranged before the network elements. If x switches (x=1 . . . n–1) are now operated in position a and the remaining n–x switches in position b, both data lines Line 1 and Line 2 can be adequately monitored. The network elements NE 1 . . . NE x monitor the performance of the data transmission line Line 1 via their RST and MST functions and the network elements NE (x+1) . . . NE n the performance of the data transmission line Line 2.

Monitoring both data transmission lines Line 1 and Line 2 by monitoring functions within the network elements, such as by using the detection of a failure of the frame synchronization or via the bit error rate, is also far more accurate and inexpensive than, for example, monitoring using sensors at the input of switches SE. If, for example, optical amplifiers, erbium doped fiber amplifiers (EDFGA), are fitted in the link, the presence of an optical signal can be feigned by the noise of the amplifier, so that the sensors cannot detect a signal failure. In this case, monitoring for failure of the frame synchronization or calculating the bit error rate is far more definite.

The quality or performance values of the individual network elements NE 1 . . . NE n are signaled to a central monitoring circuit MON that, therefore, has an overview of the quality of data transmission lines Line 1 and Line 2. It is even sufficient for the monitoring of the data transmission lines Line 1 and Line 2 if from each group of the network elements NE 1 . . . NE x and NE (x+1) . . . NE n one network element in each case signals its quality or performance values to the central monitoring circuit MON. This central knowledge is a further advantage of the method in accordance with the present invention.

If, during a disturbance, data transmission line Line 1, for example, fails, the network elements NE 1 . . . NE x determine this on the basis of their RST and MST monitoring function and signal this to the monitoring circuit MON.

If the data transmission line Line 2 is OK, which is known to the monitor circuit MON because of the information of the network elements NE (x+1) . . . NE n, the monitor circuit switches the switches S1 . . . S x to position b and thus to the intact data line Line 2.

It is now advantageous if also, after a fault, it can be automatically detected whether the data transmission line Line 1 is again OK, because after the fault all switches S1 . . . S n are in position b. This can be achieved by an arrangement corresponding to FIG. 3.

In this case, both sides are provided with only (n−1) network elements for the transmission of useful signals and a network element NE (P) at the receiver end is used to check in the event of a fault whether the disturbed data transmission line is again OK. If, for example, data transmission line Line 2 is faulty, the network elements NE 1 . . . NE (n−1) are connected via their respective switches in position a to data transmission line Line 1. The network element NE (P) n is connected via its switch S n in position b to data transmission line Line 2 and can thus check whether this is again available.

Figure 4:
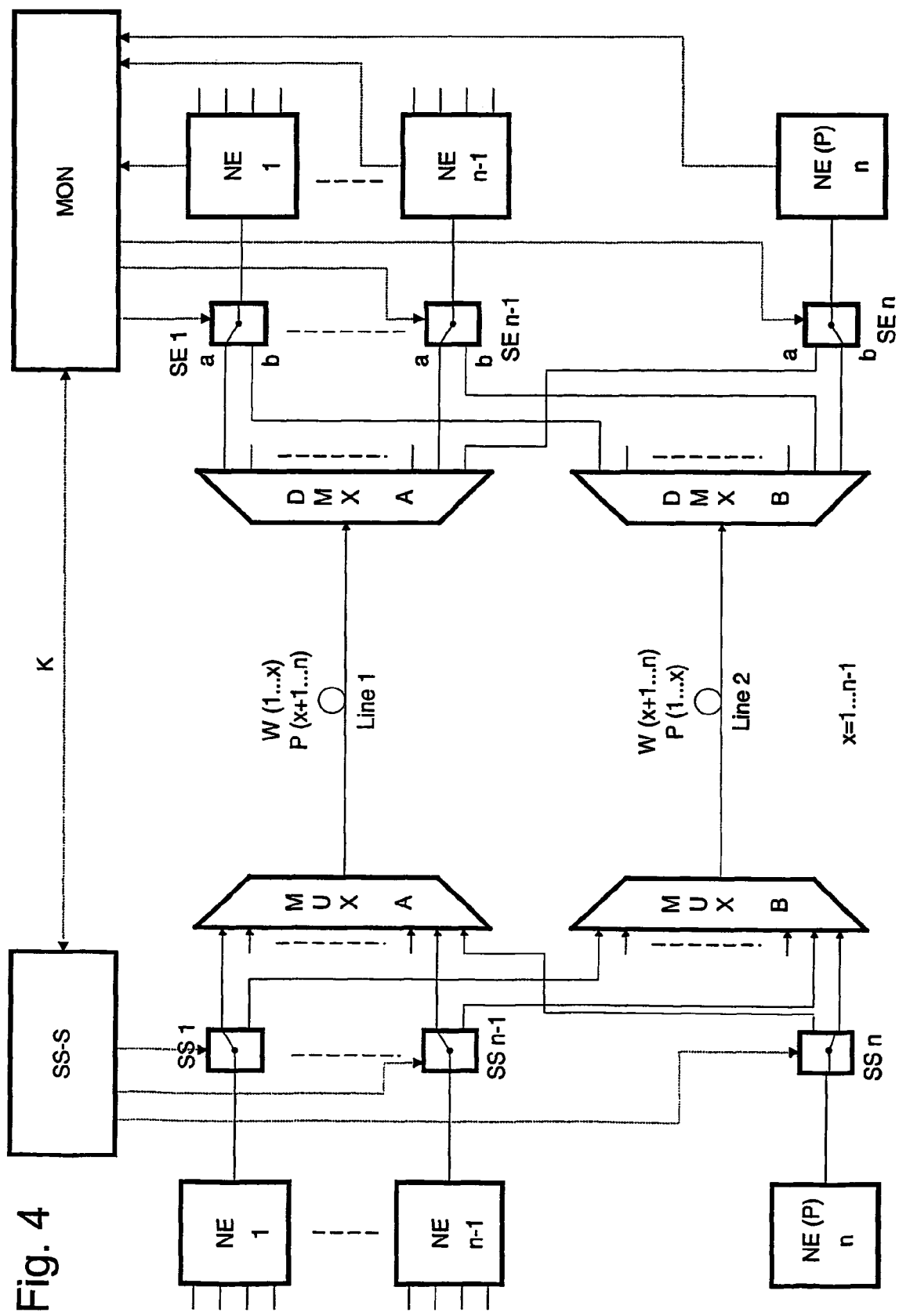
FIG. 4 shows a circuit arrangement in accordance with FIG. 2 but with optical switches at the transmitter side instead of splitters.

A further variant of the present invention is shown in FIG. 4. In this case, optical switches SS 1 . . . SS n are fitted in the transmitting direction instead of optical splitters. The advantage of this is that passband attenuation of the optical switches is less than the attenuation of the optical splitter, which amounts to 3 dB. This enables a greater range of the WDM link to be achieved. However, to do this communication between the monitor circuit and a controller of the optical switches SS 1 . . . SSn is necessary.

The monitor circuit in this case acts as a master and the controller as the slave. As such, the monitor circuit MON informs the controller SS-S via the communication path K of the direction in which the individual switches SE 1 . . . SE n are set. The controller then switches switches SS 1 . . . SS n in the same direction so that transmission via the correct WDM link is guaranteed.

Here also a network element NE p can be provided for this purpose and, in the event of a fault in a WDM link the faulty data transmission line can be monitored for restoration of functional capability.

Figure 5:
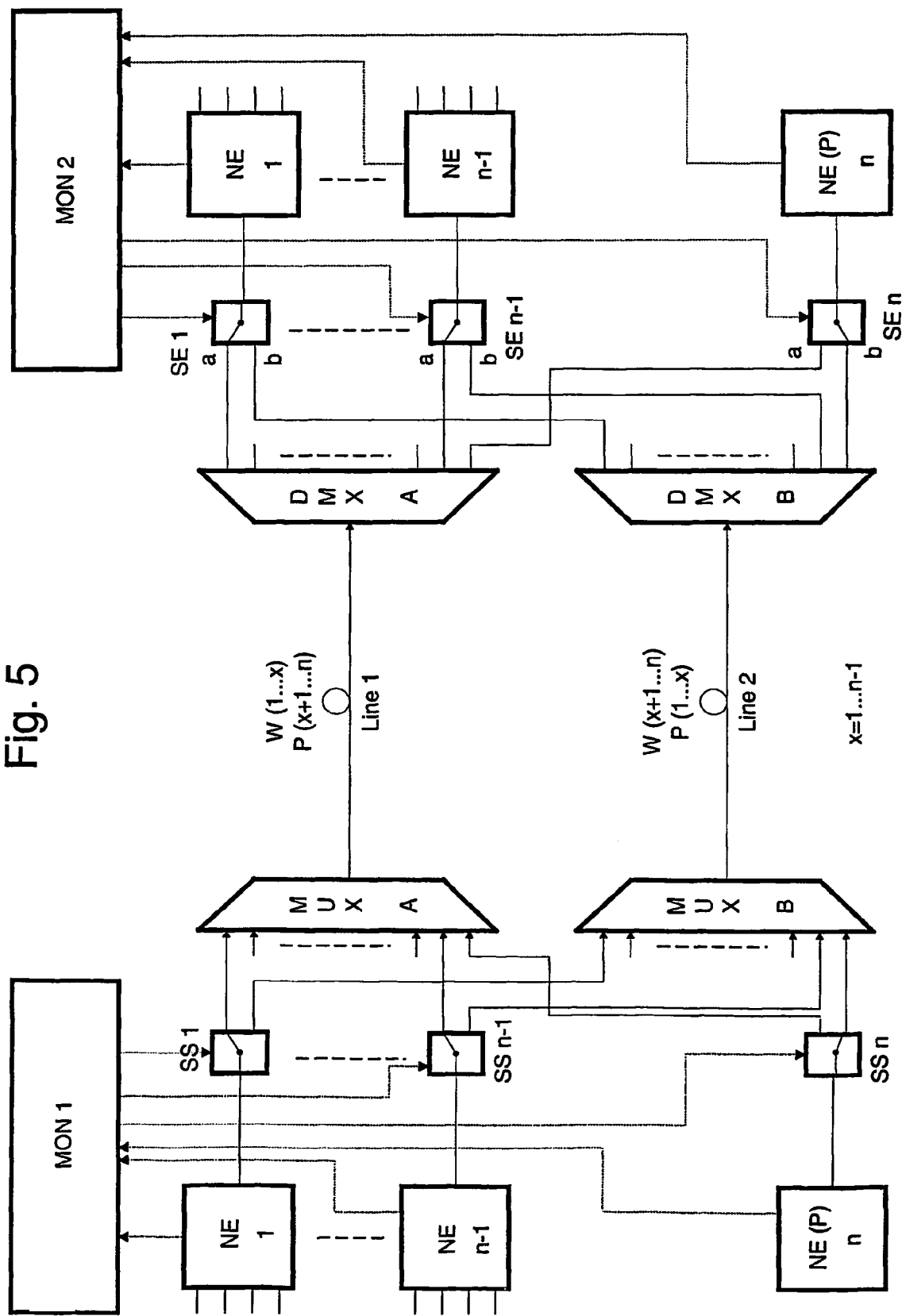
FIG. 5 shows a circuit arrangement with a monitor at both the transmitter side and receiver side.

A further circuit arrangement is shown in FIG. 5. In this case also optical switches SS 1 . . . SS n are provided in the transmitting direction. In contrast to the method shown in FIG. 4, however, there is no own communication path K. Instead, a monitor circuit MON 1 and MON 2 is required at both the transmission and reception sides.

Figure 6:
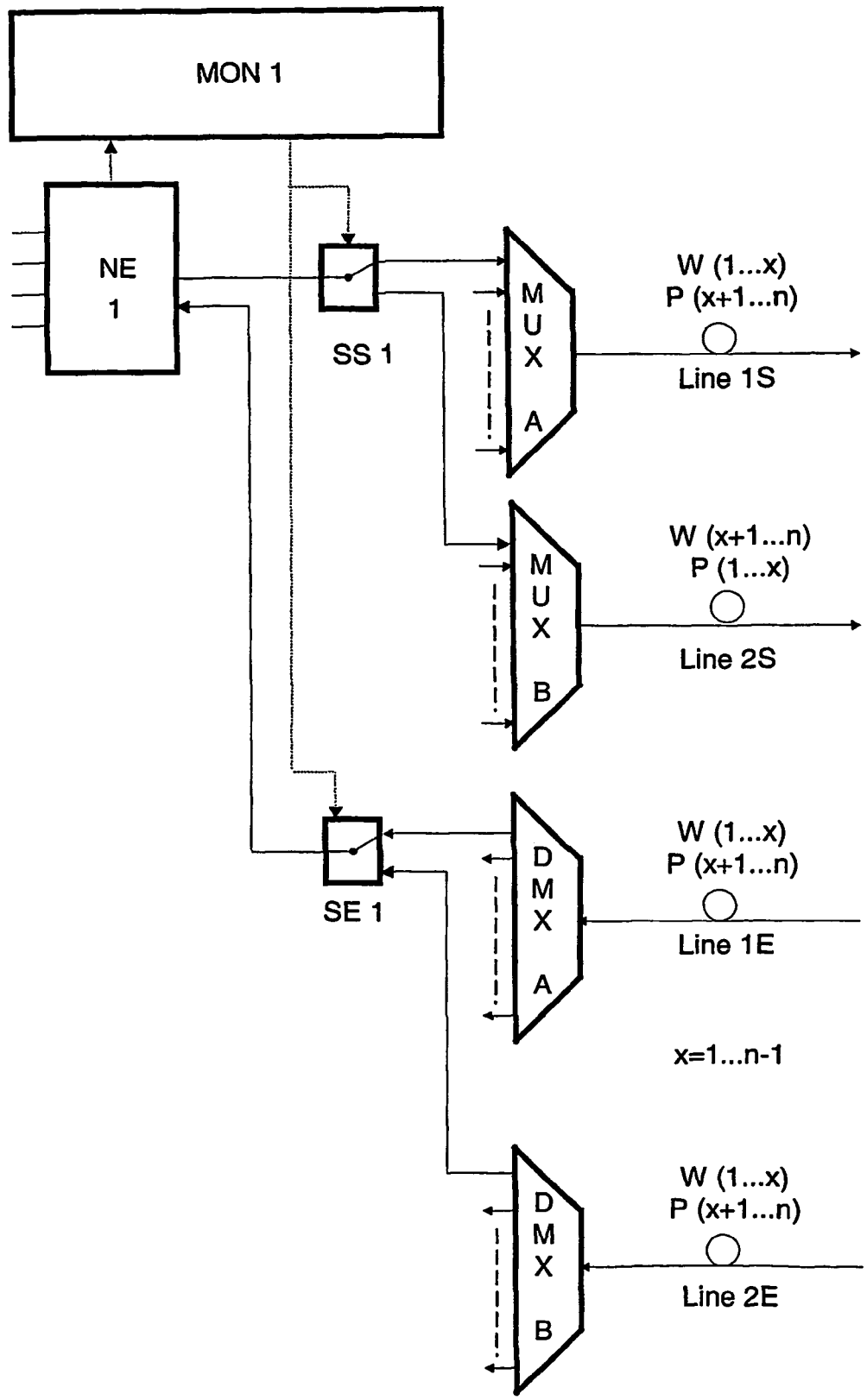
FIG. 6 shows a detailed representation from FIG. 5 showing data transmission links in the return direction.

The principle of the method used here is shown in more detail in FIG. 6, in which both the outward and return directions of the network element NE 1 are now shown. The monitor circuit MON 1 sets the transmission and reception side switches SS 1 and SE 1 both in the same direction. The setting of the reception side switch SE 1 is used in this case as preset, with the transmission side switch SS 1 then being set in the same direction.

To explain the functioning in more detail, it is first of all assumed that, in the transmission direction, the data transmission line Line 1S and in the reception direction data transmission line Line 1E are operated as a working link.

If now, for example, the data transmission line Line 2E fails, this is detected by the network element NE 1 and signaled to the monitor circuit MON 1. This monitor circuit MON 1 then sets the reception side switch SE 1 to the data transmission line Line 2E and the transmission side switch SS 1 to the data transmission line Line 2S.

At the opposite side, the network element NE 1 then receives no signal on the data transmission line Line 1S and, therefore, also switches to the data transmission line Line 2S. The automatic switching from data transmission line Line 1 to data transmission line Line 2 is thus carried out. To avoid this causing periodic switching operations, the switches must remain in the new setting for a certain time after switching to enable the opposite point to switch over.

It is pointed out that the network elements shown in the illustrations in each case at the receiver end and transmitter end are, in practice, identical components that in each case have both a reception path and a transmission path, whereas in the illustrations only the corresponding path is shown for each side and only the reception path has an RST and MST function.

In sum, the present invention provides a simple method and a simple electro-optical circuit arrangement for line protection in a WDM data transmission link with at least two selectable optical data transmission lines that in each case can transmit data via n data channels, with the switching to the required data transmission line taking place in each case in accordance with the present invention by optical switches between the reception side network elements and demultiplexers. As such, simple and inexpensive line protection with a "point-to-point" connection is achieved in this way.

Although the present invention has been described with specific embodiments, those of skill in the art will recognize that changes may be made thereto without departing from the spirit and scope of the present invention as set forth in the hereafter appended claims.

The invention claimed is:

1. A circuit arrangement for line protection of an optical data transmission link, comprising:
    at least two selectable data transmission lines, arranged between a transmitter side and a receiver side in a point-to-point network topology, through which optical signals can be transmitted via n data channels, having different frequencies;
    n network elements provided at the transmitter side to convert electronic data signals to optical signals;
    a multiplexer connected after each respective network elements for each data transmission line;
    a demultiplexer respectively assigned to each multiplexer on each data transmission line;
    a plurality of optical switches arranged on the transmitter side and receiver side, via which outputs of the demultiplexers are respectively assigned to one of the n data channels, the optical switches respectively switching the data transmission line to a respective input of n receiver side network elements for optical/electronic conversion, and wherein the optical switches on the transmitter side mirror positions of optical switches at the receiver side;

an additional communication path between the receiver and transmitter sides in order to control the optical switches at the transmission at the transmission side;

a controlling device that manages optical switches on the transmitter side;

a monitoring device that manages optical switches at the receiver side and acts as a master to the controlling device, wherein, after the optical/electrical conversion occurs in the receiver side network element, the signal switched via one of the optical switches is respectively applied to the monitoring device for determining quality or power values of the data transmission, and wherein, using the quality or power values determined, the monitoring device directs the controlling device to switch the optical switch to a particular optical data transmission line with better quality.

2. A circuit arrangement for line protection of an optical data transmission link as claimed in claim 1, wherein quality or performance values of the switched signal are applied to inputs of the monitoring device that is common to all receiver side network elements, with output signals derived therefrom being connected to the optical switches.

3. A circuit arrangement for line protection of an optical data transmission link as claimed in claim 1, wherein the monitoring device is used for switching of all individual switches.

4. A circuit arrangement for line protection of an optical data transmission link as claimed in claim 1, wherein Regenerator Section Termination functions are provided in the receiver side network elements for monitoring the quality of the data transmission.

5. A circuit arrangement for line protection of an optical data transmission link as claimed in claim 1, wherein parts are provided for at least one of checking a frame synchronization and determining a bit error rate for each data transmission line or data transmission channel.

6. A circuit arrangement for line protection of an optical data transmission line as claimed in claim 1, wherein the monitoring device directs the controlling device to switch the optical switch to a particular optical data transmission line with better quality if the quality of a data transmission line falls below a certain value.

7. A circuit arrangement for line protection of an optical data transmission link as claimed in claim 1, wherein at least one network element is provided for monitoring a failed data transmission line.

8. A circuit arrangement for line protection of an optical data transmission link as claimed in claim 1, wherein the data transmission lines are glass fibers.

9. A circuit arrangement for line protection of an optical data transmission link as claimed in claim 1, wherein at least two data transmission lines are provided on separate paths.

* * * * *